June 11, 1929.   W. J. LAFFEY   1,716,825
CAR RETARDER
Filed Feb. 17, 1928   3 Sheets-Sheet 1
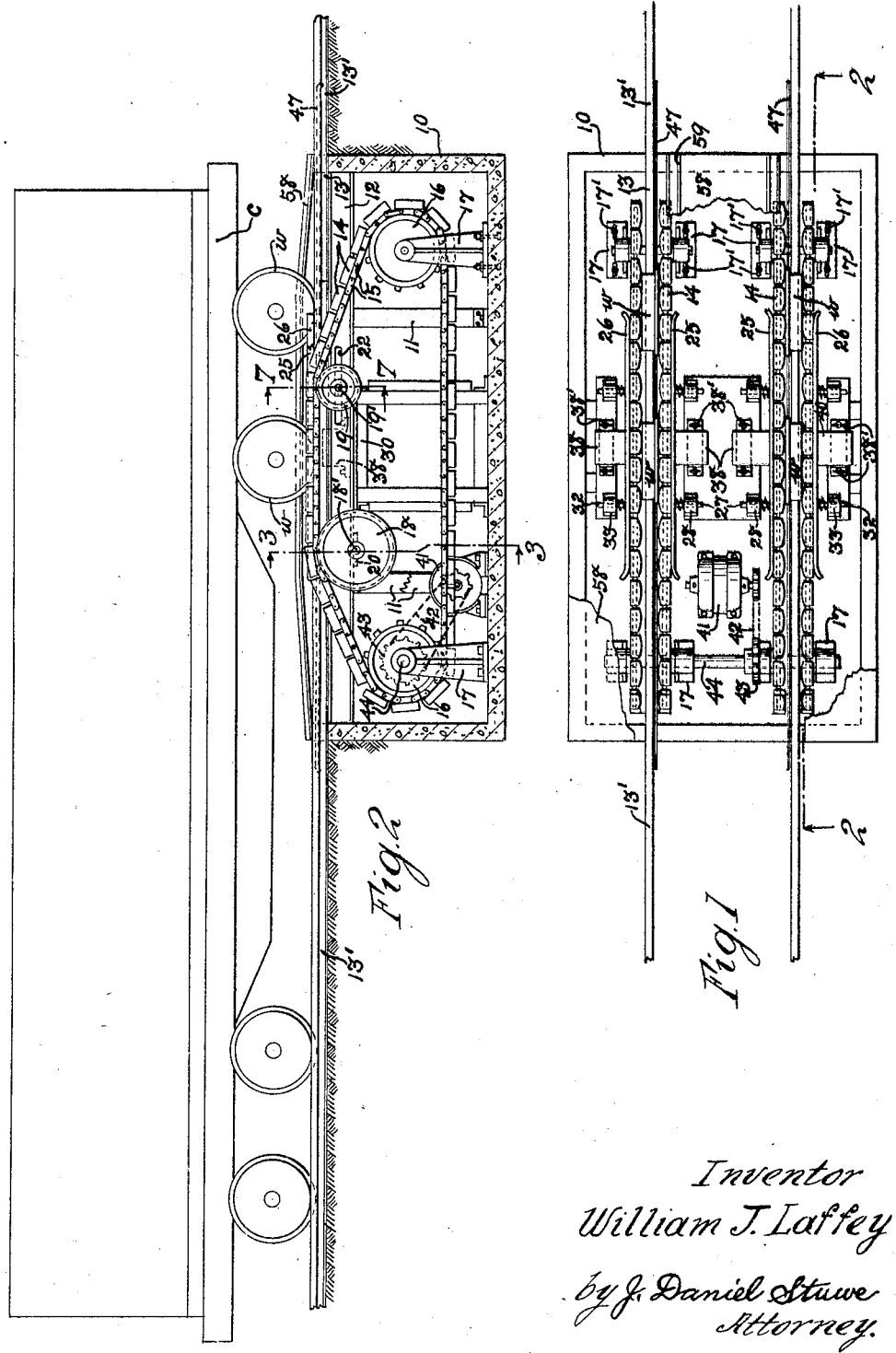
Inventor
William J. Laffey
by J. Daniel Stuwe
Attorney.

June 11, 1929.                    W. J. LAFFEY                    1,716,825
                                  CAR RETARDER
                               Filed Feb. 17, 1928          3 Sheets-Sheet 2
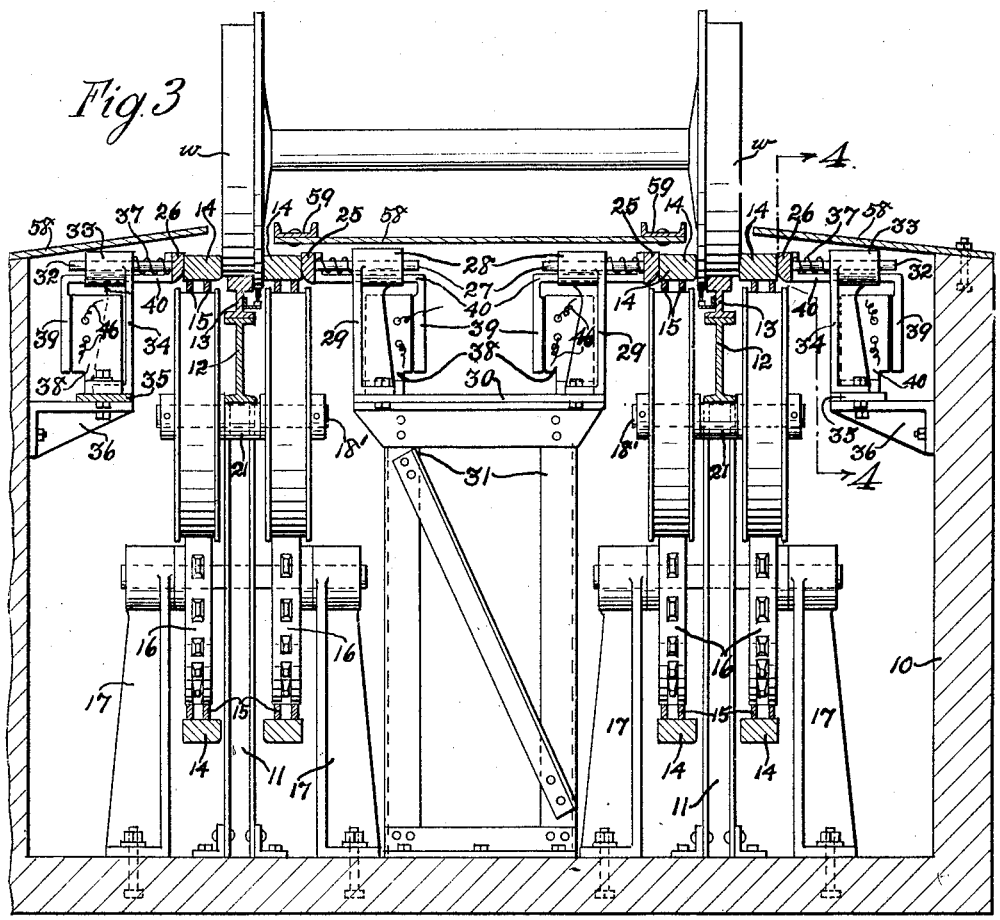
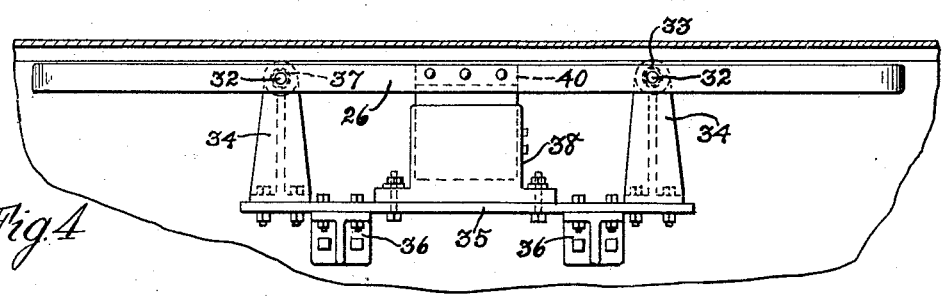
Inventor
William J. Laffey
by J. Daniel Stuwe
         Attorney.

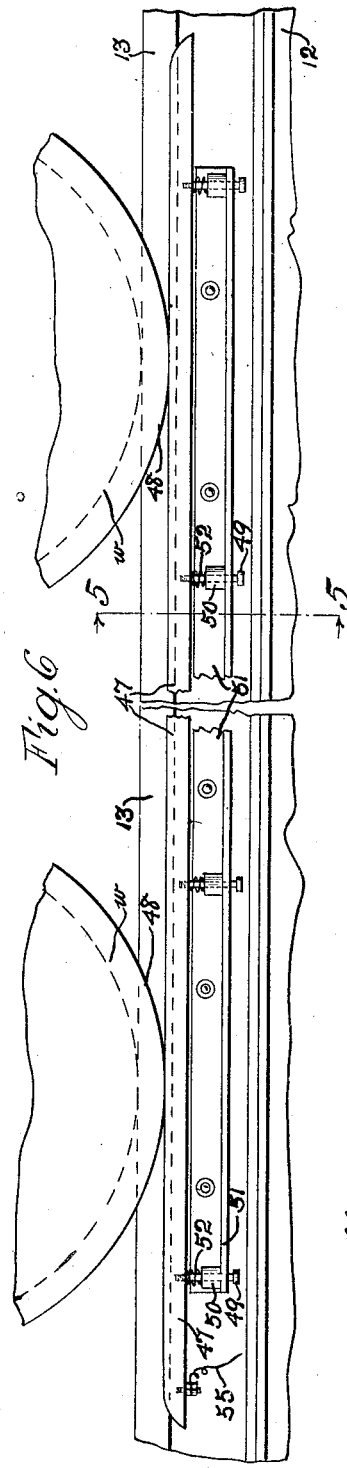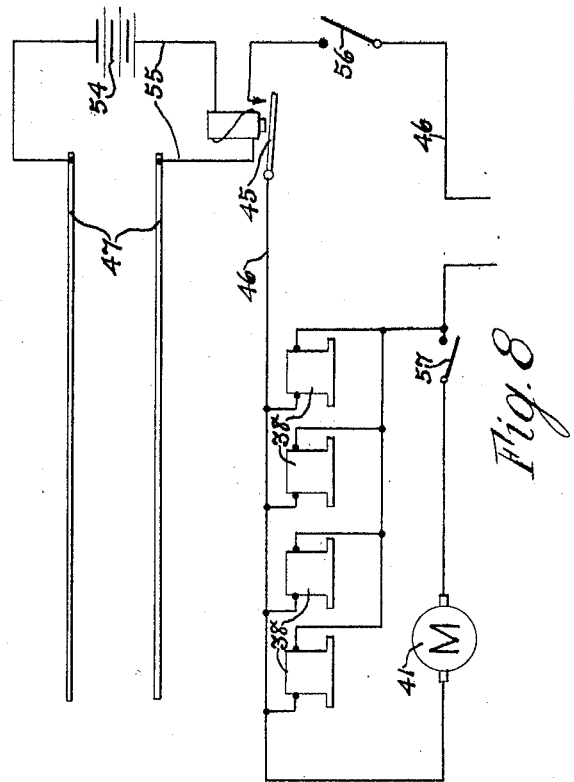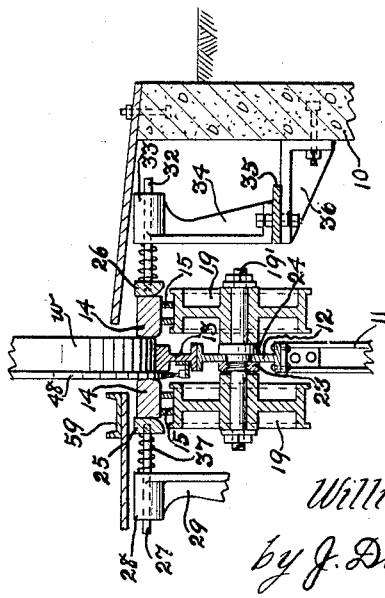

Patented June 11, 1929.

1,716,825

UNITED STATES PATENT OFFICE.

WILLIAM J. LAFFEY, OF CHICAGO, ILLINOIS.

CAR RETARDER.

Application filed February 17, 1928. Serial No. 255,008.

This invention pertains to a car retarder, adapted to prevent damage to cars and their contents during terminal switching, and one which is particularly adapted for installation in hump or gravity yards, but which is also adapted for use in level yards where flat switching is performed.

The main object of this invention is to provide a practical and improved car retarder of this kind which will operate entirely automatically, without the need of a human operator, thus avoiding the chance of human error; and to provide such a car retarder which will operate with full efficiency in the different yards of various gradient and under the different conditions of temperature and moisture, and whereby the cars of different types and weights and with different speed and momentum, when entering the retarder, will be discharged thereby uniformly at the selected rate of speed. Another object is to provide the retarder with several series or chains of elements, preferably in the form of chains of shoes, for clasping the car wheels and to travel on the retarder in the direction of travel of the car, and to be set to travel at the desired or selected speed, for gradually retarding the speed of the different cars and discharging them uniformly at the selected speed. A further object is to provide automatically operating means for making the retarder operative by the entry of a car thereon, and to set the retarder at rest or inoperative when the car is discharged therefrom. Another object is to provide electric power means or drive means for automatically causing the chains of shoes to travel at the selected speed, and which means is arranged for driving the chains of shoes in either of two reverse directions, and is also arranged to be left idle, if desired, while the shoes are caused to travel along with the car wheels over the retarder by means of their combined frictional and magnetic engagement with the wheels. Still another object is to provide electro-magnetic means for pressing the shoes with great force against the wheels and to additionally cause a magnetic holding effect therebetween, thus providing a maximum braking effect, which may be adjusted, and which may be set to cause the wheels to slide before they leave the retarder.

The above objects and other objects and advantages are attained with this invention, as will become apparent from the following description, taken in connection with the accompanying drawings, in which, Fig. 1 is a plan view of the preferred form of this invention, having the cover plate broken away, and showing several car wheels on the retarder;

Fig. 2 is a vertical sectional view on line 2—2 of Fig. 1, showing a car with the wheels of one of its trucks on the retarder;

Fig. 3 is an enlarged vertical cross-section on line 3—3 of Fig. 2;

Fig. 4 is a detail section on line 4—4 of Fig. 3;

Fig. 5 is a detail section on line 5—5 of Fig. 6;

Fig. 6 is a side view showing the control bar of the automatic control switch actuated by the wheels of the car passing over the retarder;

Fig. 7 is an enlarged vertical section on line 7—7 of Fig. 2; and

Fig. 8 is a diagrammatic view of the electric operating mechanism and the wiring and switches thereon.

In the drawings my invention is illustrated in its preferred form of construction which comprises a housing or pit 10 wherein are provided pillars or posts 11 carrying I-beams 12 on which are supported the rails 13 of the portion of the switch track 13', that is located over the retarder.

The retarding or wheel engaging means of the retarder preferably comprises several series or chains of shoes 14, arranged along both sides of the rail, for engaging and clasping the chilled or hardened rim part of the wheel therebetween, as indicated in the drawings. These shoes are arranged to travel with the wheels "w", in the direction of travel of the car "c" on the rails 13, and are preferably pivotally connected with link means 15 to form an endless chain or series of shoes, a chain of shoes being placed along each side of each raid 13, as shown. Said chains of shoes are mounted for travel on sprocket wheels or members 16 which are journaled, with suitable shafts, on posts or supports 17 that are adjustably mounted with bolt and slot means 17' adjacent the opposite ends of pit 10; and on idler wheels or pulleys 18 and 19 which are adjustably mounted, respectively, with shafts 18' selectively fastenable in slots 20 provided in brackets 21 under I-beams 12, and with shafts 19' adjustably held in slots 22 in said I-beams, by means of nuts or threaded members 23 and 24. See Figs. 2, 3, and 7. By adjusting said idler members 18 and 19, farther apart or closer together, one can modify the effective or operative length of the upper or wheel engaging portion of the chain of shoes, to the extent desired.

Means is provided for forcefully pressing the shoes against the wheel rims, and this means preferably comprises beams or bars 25 and 26 bearing against the sides of the shoes and along which the shoes travel. The inward beams 25 are supported by rods 27 which are slidable in bearings 28 on bracket arms 29 arising from a table or platform 30 which is supported on legs 31 adjacent the center of the pit; and the outer beams 26 are similarly supported by rods 32 which are slidable in bearings 33 on arms 34 arising from shelves 35 mounted by brackets 36 on the side walls of the pit. Springs 37, placed on said rods 27 and 32, hold beams 25 and 26 in position so as to loosely engage brake shoes 14, while the beams and retarder are not in operation.

The forcing means for operating the beams and thereby the shoes preferably comprises electric means in the form of powerful electro-magnets 38, which may be adjustably mounted on table 30 and on shelves 35, as with bolt and slot means 38', as best indicated in Fig. 1, so as to vary the pressure of the beams on the shoes and the retarding effect of the shoes on the wheels. These electro-magnets include the armatures or movable members 39 which are secured with arms 40 to the beams 25 and 26, for forcing these beams and thereby the shoes against the wheel rims. These electro-magnets are mounted close together at the opposite sides of the rail and the co-operating pair of chains of shoes, and will while energized also produce magnetic attraction between the shoes and the wheels which are being clasped thereby, thus providing a compound or double effect of the combined magnetic and clamping actions of the shoes on the wheels positioned therebetween, so as to cause the wheels to be positively held and retarded to the desired speed. With this adjustable construction and this compound retarding effect of the shoes on the wheels, the wheels may be clamped so firmly as to cause them to slide on the track before they are released from the retarder at the time of leaving the same.

Drive means, preferably in the form of electric power means, is also provided for positively causing the chains of shoes to travel and at a selected speed, and this means preferably comprises an electric motor 41 mounted in the pit and driving flexible means 42 which drives a wheel or member 43 secured on a shaft 44 whereon are fastened sprocket wheels 16 located adjacent one end of the pit, as best shown in Fig. 1. This motor and its connected means 42, 43, and 44 and 16, are gaged to be set so as to drive the chains of shoes at the particular speed selected, usually at two miles to three miles an hour, and will retard the cars, by their passage therethrough, to leave at substantially the same speed of three miles an hour, even though they are of various weights and enter at different speeds and have acquired vastly different momentum; because the shoes clasp or clamp the wheels therebetween, first of the front truck and then of the rear truck of the car, so firmly and effectively as to leave the retarder substantially at the selected speed of travel of the chains of shoes of this retarder. Said power means with its driving connections is also adapted to drive these chains of shoes in either one of the two opposite directions.

Automatic operating means is provided for setting the retarder in operation when a car enters the retarder and for again setting it at rest when the car passes from the retarder, and this automatic means preferably comprises an automatic control switch 45 interposed in the main operating circuit 46 of the retarder, and said switch may be of any suitable construction, as a control circuit 55 with a solenoid therein, as shown, for closing said switch. Said circuit 55 is closed by a car axle and its pair of wheels moving over the operating bars 47 which are placed along the sides of rails 13 and are depressed by the flanges 48 of the wheels, as best shown in Figs. 5 and 6. These bars are mounted on pins 49 which are slidable in spools 50 mounted on angle bars 51 fastened to rails 13. Springs 52 on pins 49 raise said bars 47 into firm engagement with the wheel flanges and to compensate for differences in length of flanges; then when the car wheels pass from these bars 47, as the car leaves the retarder, circuit 55 is again opened, whereby its solenoid is deenergized, thereby automatically opening the control switch 45 and rendering the retarder inoperative or at rest. Insulating means 53 is placed between said angle bars 51 and the rails 13, as best indicated in Fig. 5.

The electric operating mechanism and the automatic control means, as indicated in Fig. 8, also includes a low voltage battery 54 in the circuit 55 of the control switch 45, said circuit being completed between the metal operating bars 47 by means of the pair of car wheels and their connecting axle which are depressing said bars, as best indicated by Figs. 3 and 8. A master switch 56 is also provided in the main circuit 46, to open said circuit and place the retarder out of operation if desired; and a switch 57 is also provided for cutting-out the motor 41, when said motor is not desired or needed for causing the chains of shoes to travel, and when the retarding effect of this retarder is not too great on the cars without the aid of this motor. The electromagnets 38 are connected in parallel in the main circuit, as indicated, to operate automatically upon the closing of the control switch 45, by the entry of the car on the retarder.

Cover means 58 is also provided over the pit or housing, preferably having reinforcing bars 59 thereon, as indicated in Fig. 3.

It is apparent that with a car retarder of this improved construction, and by properly adjusting the speed of travel of the driving means for the chains of shoes and the length of the upper wheel engaging portions of the chains of shoes, and by adjusting the electromagnets to the extent desired, the wheels may be clamped sufficiently to retard the car down to the speed of the chains of shoes before it leaves the retarder; and when conditions are favorable, as warm weather for limbering all bearings of the car and a strong wind blowing with the car coming down the hump onto this retarder in the switch track, then the chain driving means need not be set in operation for carrying the car slowly forward, as the retarding effect upon such car with increased momentum will not be too great, and the car will not need the aid of the driving means to move it out of the retarder.

What I claim as my invention and desire to secure by Letters Patent is:

1. A car retarder comprising means for grasping the wheels of a car to retard the rotation of said wheels and to travel on the retarder, and means for automatically operating the retarder by the car passing thereover.

2. A car retarder comprising shoe means for clasping the wheels of a car therebetween and to travel on the retarder in the direction of travel of the car, and means operating automatically to set the retarder in operation by means of the entering car and to set the retarder at rest when said car leaves the retarder.

3. A car retarder comprising traveling shoes for engaging and retarding the car wheels, members along which said shoes travel, and power means to automatically actuate said members for operating said shoes by means of the car on the retarder.

4. A car retarder comprising traveling shoe means for engaging the car wheels, members along which said shoe means travels, and electro-magnets for operating said members to force said shoe means against the wheels and to hold the wheels thereby through the combined effect of pressure and magnetic action.

5. A car retarder comprising traveling elements for engaging the car wheels and to travel therewith on the retarder, members along which said elements travel, means for operating said members to force said elements in firm engagement with the wheels and means for automatically actuating the last said means by the car on the retarder.

6. A car retarder comprising shoe means arranged in an endless chain, means on which said chain of shoes travels and including means adjustable for modifying the effective part of said chain of shoes engaging the car wheels, and means for pressing the shoes against the wheels and along which the same travel.

7. A car retarder comprising shoes arranged to travel in an endless chain, drum and idler means on which said shoes travel, means for adjusting some of said means for varying the effective length of the part of the chain of shoes engaging the car wheels, members along which said shoes slide, and automatically operated means for forcing said members and thereby the shoes against the wheels.

8. A car retarder comprising shoes arranged in several chains, rotary means on which the chains of shoes travel and including means for varying the length of the wheel engaging parts thereof, members along which said shoes slide, power means for forcing said members and thereby said shoes to clasp the wheels, and means for automatically actuating said power means.

9. A car retarder comprising chains of shoes and means whereon they travel, beams relative to which said chains of shoes travel, and magnetic means for operating said beams and force said shoes to clamp and retain the wheels therebetween by the combined effect of pressure and magnetic action.

10. A car retarder comprising a series of elements, means for forcing the same in engagement with the car wheels, and means for causing said series of elements to travel at a selected speed and in either of two opposite directions, for retarding and discharging the cars uniformly in one of said directions at said selected speed although the cars are of different weight and come on the retarder at different speeds.

11. A car retarder comprising a series of shoes for engaging the car wheels, means for forcing the shoes against the wheels, parallel to the axes of the wheels, means for causing said series of shoes to travel at the selected speed and in the selected direction, and means for operating both of said means automatically by the car on the retarder.

12. A car retarder comprising endless chains of shoes adapted to travel alongside the track rails which are located on the retarder, means for forcing said shoes to clasp the wheels, rotary members and power means for driving them and the chains of shoes, and electric means for automatically operating both of said means by the car on the retarder to clamp the wheels between the shoes and retard the speed of the car substantially to the speed of the traveling chains of shoes.

13. A car retarder comprising several endless chains of shoes, each of said chains of shoes being provided with rotary means for supporting an operative portion of the chain adjacent the track rails, adjustable means for modifying the effective length of said operative portion for varying the extent of engagement with the car wheels, means for operating said chains of shoes at a selected speed, members for pressing said shoes against the wheels, means for operating said members, and means automatically operated by the car wheels on the retarder for actuating the chain operating and the member operating means.

14. A car retarder comprising several endless chains of shoes, means for supporting said chains of shoes in pairs to have a certain portion operative adjacent the track rail for clasping a wheel between the shoes of one pair, means for driving said chains of shoes at the selected speed, said driving means being adapted to be left idle to let the wheels of the car traveling on the retarder move the chains of shoes, members for forcing said operative portions of the chains of shoes to clamp the wheels therebetween, power means for actuating said members, and means operated automatically by the car wheels on the retarder for operating either the driving means and the power means together, or for operating one thereof.

15. A car retarder comprising a housing having portions of the switch track rails extending thereover, rotary means and endless chains of shoes thereon mounted in said housing, arranged to have the chains travel and have portions movable adjacent the rails for clasping the car wheels, means in the housing for driving said chains of shoes, members for pressing the shoes against the wheels and along which the shoes slide, magnetic means for actuating said members and being adjustably mounted in the housing, covering means for the housing, and means for automatically operating the driving means and the magnetic means, for clamping the shoes on the wheels to retain and retard them by the combined effect of pressure and magnetic action.

16. A car retarder comprising a housing and means therein for supporting a portion of the switch track rails, rotary means and endless chains of shoes thereon mounted in the housing to travel and have portions operative adjacent the rails for clasping the car wheels, beams along which the shoes slide, magnetic means for operating the beams to clamp the shoes on the wheels, power means selectively operable for driving the chains of shoes at a certain speed, said power means and magnetic means being mounted in the housing, and means for operating said power means and said magnetic means automatically by the car wheels on the retarder.

In testimony whereof I have signed my name to this specification.

WILLIAM J. LAFFEY.